United States Patent [19]

Hamilton et al.

[11] 3,920,057
[45] Nov. 18, 1975

[54] FELLING HEAD

[75] Inventors: Douglas D. Hamilton, Mount Royal; Joseph J. R. Boivin, Montreal, both of Canada

[73] Assignee: Logging Development Corporation, Montreal, Canada

[22] Filed: Feb. 25, 1975

[21] Appl. No.: 552,879

[30] Foreign Application Priority Data

Mar. 14, 1974 Canada................................ 195031
Mar. 4, 1974 Canada................................ 193978

[52] U.S. Cl................................ 144/34 E; 144/3 D
[51] Int. Cl.²......................................... A01G 23/02
[58] Field of Search .. 144/3 D, 34 R, 34 E, 309 AC

[56] References Cited

UNITED STATES PATENTS

| | | | |
|---|---|---|---|
| 3,540,501 | 11/1970 | Jonsson.............................. | 144/34 E |
| 3,640,322 | 2/1972 | Allen.................................. | 144/34 E |
| 3,675,691 | 11/1972 | Denovan............................ | 144/3 D |

*Primary Examiner*—Othell M. Simpson
*Attorney, Agent, or Firm*—Shanley, O'Neil and Baker

[57] ABSTRACT

A grapple for handling trees and adapted to be mounted on the free end of an extendible and retractable boom. The grapple has a frame which is arcuate in a direction facing a tree gasped by grapple arms mounted on the frame providing a light assembly compared to existing known grapples. The terminal ends of the arcuate shaped frame provide heeling devices or abutments to engage a tree on opposite sides of grapple arms pivotally mounted on the central portion of the frame and grasping the tree. The grapple arms are moved by a hydraulic cylinder interconnecting the same. The assembly may be used as a felling head by pivotally attaching thereto a further pair of arms which have shear blades mounted on the free end thereof for severing a tree grasped by the grapple. The shear blades in one embodiment are spaced from the lowermost one of the tree abutments engaging a tree during a severing operation and in another embodiment are spaced closely adjacent such abutment. In the latter embodiment a guide is mounted on the frame for guiding the shear blades during movement of the same.

10 Claims, 5 Drawing Figures

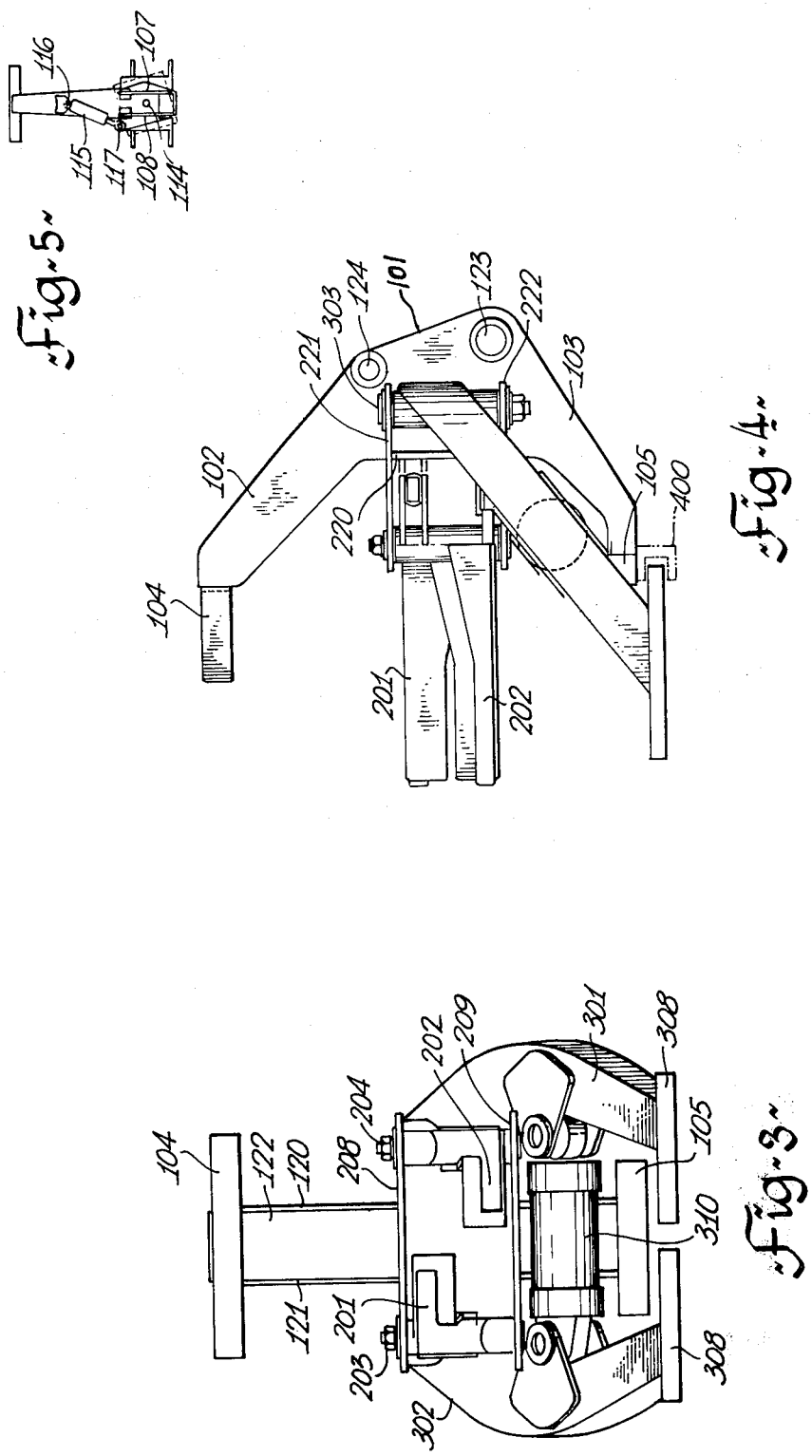

3,920,057

FELLING HEAD

This invention relates to improvements in a log handling grapple and to such improved grapple in combination with a shear to provide a felling head.

There are numerous different types of grapples and tree felling heads on the market and disclosed in various issued patents. Reference may be had to U.S Pat. No. 3,540,501 issued NOV. 17, 1970 to Karl-Erik Arnold Jonsson and Canadian Pat. No. 899,211 issued May 2, 1972 to Thomas N. Bush which are believed to be the most closely related art to the present development. In the mechanization of field logging operations a grapple or felling head is mounted on the free end of an extendible and retractable boom carried by a mobile vehicle. A typical felling head, as disclosed in U.S. Pat. No. 3,540,501, weighs in the neighbourhood of 2,800 to 3,000 pounds and it will be realized this weight mounted on the free end of a boom can, under various conditions, cause instability of the vehicle. The weight of the felling head is caused by substantial material required for strength to manipulate trees of various sizes and which may range from 6 to 18 inches in diameter.

A principal object of the present invention is to reduce the weight of the grapple and felling head without sacrificing strength of the same. Typically known grapples and felling heads are also of relatively large dimension and a further object of the present invention is to provide a design reducing the overall size of the assembly.

A further principal object of the present invention is to provide a grapple and felling head which is neat in appearance and easily constructed utilizing relatively few parts.

The foregoing objects are accomplished in the present design by providing a frame which is generally arcuate or curved in shape and which terminates at opposite ends in tree engaging members for stablizing the tree held by a grapple mounted on the frame at a position between the tree engaging members. The grapple consists of a pair of arms pivotally mounted on the frame and are movable by a hydraulic cylinder to embrace the tree and press the same against the tree engaging members. In the case of a felling head, a shear assembly is mounted on the frame with the shear blades being closely adjacent one of the tree engaging members. The arcuate frame, which provides the tree engaging members at opposite ends, has generally a central rigid portion on which the grapple jaws are pivotally mounted and on an opposite side is pivotally connected to the free end of a boom. The frame on opposite ends of the central portion slopes in a direction generally toward a tree grasped by the grapple arms and the tree engagement members abut the tree at positions spaced longitudinally along the tree on opposite sides of the grapple. The curved frame provides a relatively strong frame utilizing minimal material and thereby reduces the overall weight of the assembly.

The invention is illustrated by way of example with reference to the accompanying drawings wherein:

FIG. 3 is a front elevational view of a modified form of a felling head constructed in accordance with the present invention;

FIG. 4 is a side elevational view of the felling head illustrated in FIG. 3; and FIG. 5 is a rear view of the felling head illustrated in FIGS 1 and 2 incorporating an alternative mounting for the same.

Figure 1:
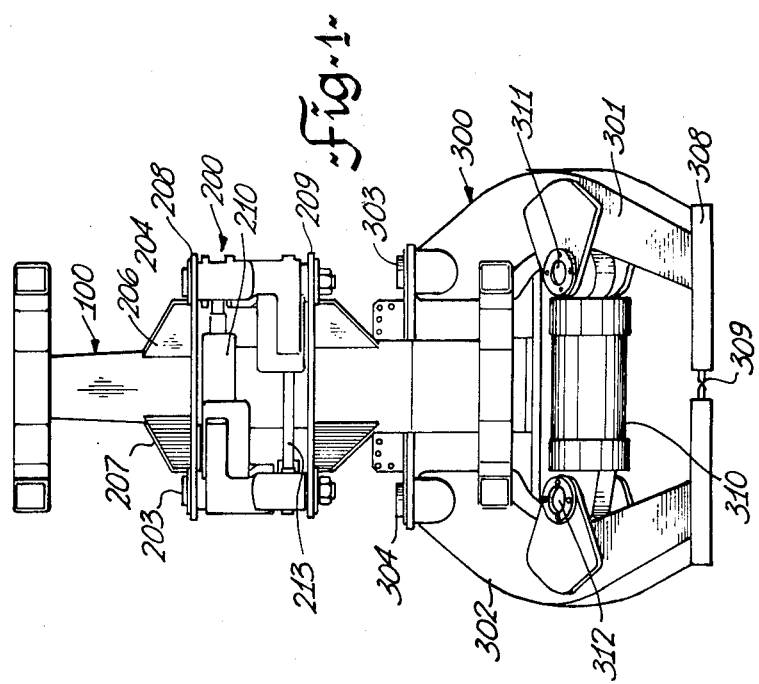
FIG. 1 is a front elevational view of a felling head constructed in accordance with the present invention.

Referring now in detail to the drawings, shown in FIG. 1 is a felling head consisting of a frame 100 having a grapple 200 and a shear 300 mounted thereon. The frame 100 is a box-shaped longitudinally entending member having a central rigid portion 101 and respective end portions 102 and 103 extending therefrom at an angle thereto. The frame portions 101, 102 and 103 are in effect a moon-shaped or arcuate frame which terminates respectively on opposite ends in tree engaging or abutment members 104 and 105. Each of the tree abutments or heeling members 104 and 105 are preferably curved to partially embrace a tree grasped by the grapple arms to be described hereinafter. The two abutments however may be straight bars if desired or a combination of one straight bar and one curved member as will be seen hereinafter with reference to the embodiment illustrated in FIGS. 3 and 4.

The grapple 200 consists of a pair of grapple arms 201 and 202 mounted on the frame portion 101 by respective pivot pins 203 and 204. To provide adequate strength and reinforce the central section of the frame portion 101, gusset plates 206 and 207 are provided and which are welded to the frame. A pair of plates 208 and 209 are secured, as by welding, to the gusset plates 206 and 207 and to the frame portion 101. Pivot pins 203 and 204 pass through and are retained in respective ones of aligned apertures in plates 208 and 209. The grapple arms 201 and 202 are secured to respective ones of a pair of sleeve members 216 pivotally mounted on respective ones of the pins 203 and 204 and are located between the plates 208 and 209. The sleeve 216 of grapple jaw member 202 has a pair of lugs 212 secured thereto and projecting therefrom in a direction toward the frame portion 101. Secured to the same sleeve is a further lug 215 projecting in a direction therefrom toward the frame portion 101. A hydraulic cylinder 210 is connected at one end to the lugs 212 by a pin and, at the other end, to the frame 100. The sleeve on which grapple jaw member 201 is secured has a lug 215 secured thereto and projecting therefrom in a direction opposite to that of the lug 215 associated with grapple jaw member 202. The lugs 215 associated with the respective grapple jaw members 201 and 202 accordingly are located respectively on diametrically opposite sides of the respective pivot pins mounting the same on the frame. The lugs 215 are interconnected by a synchronizing link 213. The hydraulic cylinder 210 accordingly effects pivotal movement of the grapple jaw member 202 about pivot pin 204 and the synchronizing link 213 effects pivotal movement of grapple jaw member 201 about its pivot pin 203.

Figure 2:
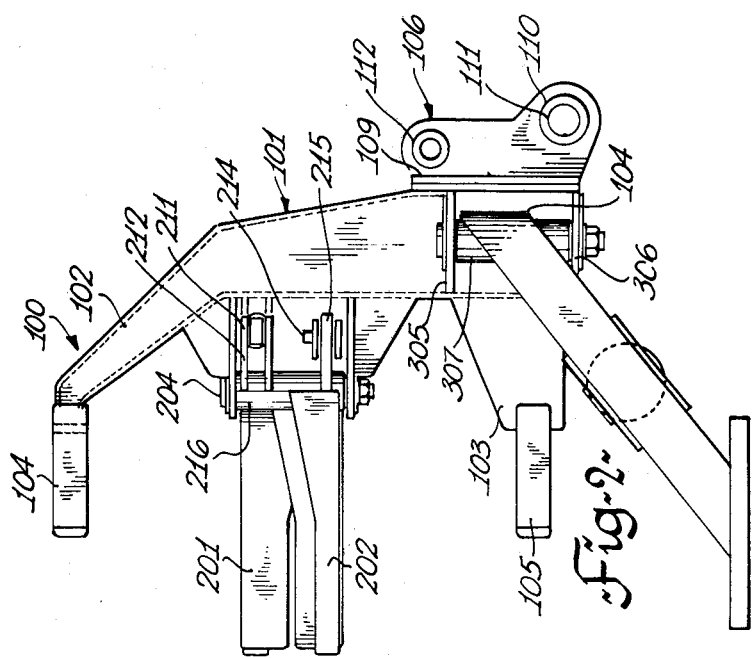
FIG. 2 is a side elevational view of the felling head illustrated in FIG. 1.

The grapple arm 201 is located vertically above the arm 202 as seen from FIG. 2. This however need not be so, but is done for the purpose of permitting the free ends of the arms to bypass one another in embracing trees of relatively small diameter.

The arrangement described thus far is a grapple for handling trees and may be used on the free end of an extendible and retractable boom to handle trees. The frame 100 has a further portion 104 depending downwardly, as viewed in FIG. 2, from the central frame portion 101. The frame portion 104 may be integrally formed with the box section providing central portion 101 or, alternatively, may be a separate element detachably secured thereto as by bolts or the like. The frame 100 has a bracket 106 secured thereto on a side opposite to the grapple arms and provides means for pivotally connecting the grapple to the free end of a boom. The bracket 106 consists of a pair of flanges 107 and 108 spaced apart from one another and secured as by welding or the like to a base member 109. The flanges 106 and 107 are interconnected adjacent one end thereof by a sleeve 110 which provides an aperture 111 for receiving a pivot pin to mount the grapple on the boom of a vehicle. The flanges 107 and 108 have journals 112 adjacent the opposite end and provide means for connecting a hydraulic piston cylinder assembly thereto to tilt the grapple relative to the boom. The boom and grapple are not shown as these are commonly known in the art. The base plate 109 is bolted to the frame portion 104 in the embodiment illustrated in FIGS. 1 and 2. With reference to FIG. 5, the base plate 109 is pivotally attached to the frame portion 104 by a pivot pin 114 allowing the frame 100 to be tilted to one side or the other from a vertical position as viewed in FIG. 5. Such pivoting is effected by a hydraulic piston cylinder assembly 115 connected at one end by a pin 116 to a bracket on the frame 100 and at the oppsite end by pin 117 to the plate 109.

In the embodiments illustrated in FIGS. 1, 2 and 5 the bracket assembly 106 is shown attached to the extending frame portion 104. For the purpose of providing merely a grapple the frame portion 104 may be dispensed with in which case the bracket 106 may be connected directly to the central frame portion 101.

The tree shear 300 consists of a pair of arms 301 and 302 pivotally attached to the frame portion 104 by respective pivot pins 303 and 304. The pin 303 passes through aligned apertures in respective ones of a pair of spaced apart plate members 305 and 306 secured, as by welding or the like, to the frame portion 104. Similarly, pin 304 is mounted on a pair of plate members 305 and 306 on the opposite side of the frame portion 104. The arms 301 and 302 each have a sleeve 307 secured thereto which receives respective ones of the pivot pins 303 and 304. The arms 301 and 302, as viewed in FIG. 2, slope downwardly and forwardly terminating at the lower end in a shear blade holder 308 having a plate-like cutting blade 309 mounted thereon. Although not shown in the drawings, the holders 308 facing one another will have an arcuate shape for receiving a tree permitting the pair of shear blades 309 to penetrate the tree during a tree severing operation. The arms 301 and 302 are pivoted about their respective pivotal connections to the frame by a hydraulic cylinder 310 connected respectively at opposite ends by pins 311 and 312 to arms 301 and 302. The hydraulic cylinder 310 is located vertically below the frame portion 103, as viewed in FIG. 2, and rearwardly of a tree grasped by the grapple arms 201 and 202 and presses thereby against the abutments 104 and 105. The pivot pins 303 and 304 have stop members incorporated therein limiting the open position of the respective arms 301 and 302. Alternatively, stops may be provided on the frame portion 104 and/or flanges 305 and 306 to limit the open position of the respective arms.

An alternative arrangement for the felling head is illustrated in FIGS. 3 and 4 wherein the shear blade holders 308 and shear blades held thereby are positioned more closely adjacent the bottom tree heeling device 105 than in the embodiment illustrated in FIGS. 1 and 2. This is accomplished by positioning the pivot pins for the arms 301 and 302 on the central section 101 of the frame.

Referring to FIGS. 3 and 4, the frame 100 has a central portion 101 and portions 102 and 103 angularly extending outwardly therefrom terminating respectively in tree engaging or heeling members 104 and 105. The upper heeling member 104 is arcuate in plan view while the lower heeling member 105 is a straight bar.

Grapple arms 201 and 202 are mounted on the central portion 101 of the frame by respective pivot pins 203 and 204 passing through aligned apertures in extensions of respective plate members 208 and 209. The plate members 208 and 209 are further interconnected by a plate or gusset 220 for reinforcing the same. The flanges 208 and 209 have portions 221 projecting rearwardly from the gusset 220 and which are secured, as by welding, to the frame portion 101. The extending portions 221 have aligned apertures therein receiving respective pivot pins 303 and 304 pivotally mounting respective arms 301 and 302 on the frame.

The frame 100, illustrated in FIGS. 3 and 4, is an I-beam having respectively opposite flanges 120 and 121 interconnected by a web 122. The flanges 120 and 121 have a pair of aligned apertures 123 and a further pair of aligned apertures 124 receiving respective ones of a pair of pivot pins. A pivot pin through aligned apertures 123 is used to mount the felling head on the free end of an extendible and retractable boom and the aligned apertures 124 permit connecting the hydraulic cylinder thereto for tilting the felling head relative to the boom.

The frame 100 illustrated in FIGS. 3 and 4 alternatively may be a box beam as illustrated and described with reference to the embodiment illustrated in FIGS. 1 and 2. In FIG. 4 there is illustrated a further alternative embodiment wherein a channel-shaped member 400 is secured to the frame portion 103 and provides a guide for the shear blade holders 308 during movement of the arms 301 and 302 about their respective pivotal connections to the frame. Obviously the channel 400 and abutment 105 may be a unitary member having a channel receiving an edge portion of the shear blade holders 308. Although not illustrated in plan view it will be obvious that because of the arms 301 and 302 moving about pivot pins, the channel in plan would have an arcuate shape. The channel 400 may be rigidly secured to the frame by welding or the like or, alternatively, detachably connected thereto as by bolts.

In the foregoing embodiments, each of the grapple and shear have two arms pivotally mounted on the frame. The arms of the grapple and the arms of the shear are movable toward and away from a common plane which passes through the frame. The pivot axes for both the grapple arms and the shear arms are located on opposite sides of such plane in spaced apart relation. If desired, the grapple and/or shear may be provided with a single movable arm and one fixed arm. The shear also may be replaced by one of the type, for example, disclosed in applicant's Canadian Pat. No. 791,445 issued Aug. 6, 1968 or Canadian Pat. No. 836,313 issued Mar. 10, 1970.

We claim:

1. A tree felling head adapted to be mounted on the free end of an extendible and retractable boom for felling standing trees comprising:

a. an arcuate rigid frame terminating respectively at opposite ends in an upper and lower tree engaging abutment member;

b. four arms each pivotally mounted on said frame at a position between said upper and lower abutments by respective ones of four pivot pins spaced apart from one another in a direction transverse to the pivot axes thereof, two of said arms being curved and projecting forwardly from the central portion of the frame providing a grapple for grasping the trunk of a standing tree at a position between the upper and lower abutments and pressing the same against such abutments and the other two arms sloping downwardly and forwardly from the central portion of the frame and terminating in free end portions located below the lower abutment;

c. a pair of shear blades secured to respective ones of the latter two arms adjacent the free ends thereof for severing the trunk of a standing tree grasped by the grapple at a position below the lower abutment; and power means connected to said arms for pivoting the same about their respective pivots.

2. A felling head adapted to be mounted on the free end of an extendible and retractable boom for felling trees comprising:

a an arcuate shape frame adapted to be pivotally connected to said boom and terminating respectively at opposite ends in an upper and lower tree engaging abutment member;

b. a pair of rigid curved grapple arms pivotally mounted on said frame adjacent the central portion thereof between said upper and lower abutment members for embracing and pressing a tree against such abutment members;

c. a second pair of arms pivotally mounted on said frame adjacent said first pair of arms and having the pivot axes thereof parallel to the pivot axis of said grapple arms, said second pair of arms being inclined to their respective pivot axes and extending away from said frame terminating in free outer end portions;

d. a pair of shear blades secured to respective ones of said second pair of arms adjacent the free terminal end portions thereof and being arranged to sever the trunk of a tree transverse to its longitudinal axis when grasped by said grapple arms, said shear blades being disposed at such a position as to shear the trunk of a standing tree adjacent but below said lower abutment member; and e. power means connected to said arms for pivotally moving the same to receive and grasp the trunk of a tree and sever the same.

3. A tree handling device as defined in claim 2 wherein at least one of said tree engaging abutment members has an arcuate face engageable directly with the surface of a tree grasped by said grapple.

4. A tree handling device as defined in claim 2 wherein said frame is a box-shaped member in cross-section.

5. A tree handling device as defined in claim 2 wherein said frame is an I-beam.

6. A tree felling head comprising in combination:

a. an arcuate, rigid frame member having a central portion and respective opposite end portions sloping outwardly therefrom in a direction away from one another;

b. an abutment on each of said sloped frame portions for engaging a tree at respective ones of a pair of positions spaced longitudinally along the tree forwardly of the central portion of the frame;

c. a grapple comprising a pair of arms pivotally mounted on said frame at a position between said tree engaging members for selectively embracing a tree and pressing the same against the tree engaging members;

d. hydraulic power means disposed at a position forwardly of the central frame portion and operatively connected to said grapple arms to effect movement of the same about their respective pivotal connections to the frame; and e. A tree severing device comprising a pair of arms pivotally mounted on said frame and each having a shear blade secured thereto adjacent a free end thereof, said shear arms being disposed at an angle with respect to the longitudinal axis of a tree grasped by the grapple and having the cutting members thereof in alignment with the bite of the grapple to sever a tree grasped by the grapple arms and pressed into engagement with the tree engaging members.

7. A tree felling head as defined in claim 6 including a channel on said frame receiving an edge portion of the tree cutting members to guide the same during movement thereof.

8. A tree felling head as defined in claim 7 wherein said channel comprises a channel-shaped member secured to the tree engaging member disposed adjacent the severing device.

9. A tree felling head as defined in claim 8 wherein the pivotal connection of the arms for the severing device and grapple are located on the central portion of said arcuate frame.

10. A tree felling head as defined in claim 2 including a U-shaped channel secured to said lower abutment and slidably receiving an edge portion of said shear blades providing a guide for the same during movement thereof.

* * * * *